US011892997B1

(12) United States Patent
Uthaman et al.

(10) Patent No.: US 11,892,997 B1
(45) Date of Patent: Feb. 6, 2024

(54) CONTENT-BASED SHARDING AND ROUTING SYSTEM

(71) Applicant: Amazon Technologies, Inc., Seattle, WA (US)

(72) Inventors: Karthik Uthaman, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/811,838

(22) Filed: Jul. 11, 2022

(51) Int. Cl.
*G06F 7/00* (2006.01)
*G06F 16/22* (2019.01)
*H04L 61/4511* (2022.01)
*G06F 16/955* (2019.01)

(52) U.S. Cl.
CPC ........ *G06F 16/2255* (2019.01); *G06F 16/955* (2019.01); *H04L 61/4511* (2022.05)

(58) Field of Classification Search
CPC .............. G06F 16/2255; G06F 16/955; H04L 61/4511; H04L 67/5682; H04L 67/51
USPC .......................... 707/705, 754, 758, 999.003
See application file for complete search history.

(56) References Cited

U.S. PATENT DOCUMENTS

| 2003/0097564 A1* | 5/2003 | Tewari ................ H04L 67/5682 713/193 |
| 2015/0188949 A1* | 7/2015 | Mahaffey ............ H04L 41/0894 726/1 |
| 2020/0084284 A1* | 3/2020 | Chauhan ................. H04L 67/51 |

\* cited by examiner

*Primary Examiner* — Md I Uddin
(74) *Attorney, Agent, or Firm* — Knobbe, Martens, Olson & Bear, LLP (57) ABSTRACT

System and methods are provided for sharding at the content level and routing content requests. Each point of presence (PoP) can initially identify the PoP that should serve content by using hashing. A PoP can encode a domain name with the identified PoP in metadata and redirect the client computing device. A client computing device transmits a DNS query for the encoded domain name. A DNS server receives the encoded domain name and decrypts and decodes the domain name label. The DNS server uses the decrypted and decoded metadata to make a further routing decision. The DNS server sends, to the client computing device, a DNS reply with the Internet Protocol (IP) address of the selected PoP. The client computing device requests content from the PoP identified by the provided IP address.

19 Claims, 7 Drawing Sheets

CONTENT-BASED SHARDING AND ROUTING SYSTEM

BACKGROUND

Clients make requests to servers for content via networks, such as the Internet. Clients typically have Uniform Resource Locators to request content, which include domain names. However, network protocols like HTTP run on top of TCP/IP that require IP addresses. A Domain Name System (DNS) query (also known as a DNS request) is a demand for information sent from a client computer to a DNS resolver. Generally, a DNS query is sent to request the IP address associated with a domain name. In some cases, the DNS resolver is the computing device that responds to the DNS query from a client. The DNS resolver does this by making a series of requests until it reaches the authoritative DNS server for the requested record. A content delivery network (CDN) refers to a geographically distributed group of servers that work together to provide network content. In a CDN, devices may be organized into points of presence (PoPs). The DNS servers for a CDN can cause HTTP traffic to be routed to different PoPs based on a number of factors, such as geography. PoPs provide the content to the client devices.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

As described above, a Domain Name System (DNS) can be used for routing network traffic. Such routing of network traffic can be applied in the context of a Content Delivery Network (CDN), which is responsible for providing network content to clients. For example, in response to a DNS query, a DNS server can respond with the IP address of a point of presence (PoP) selected from among several other points of presence (PoPs). PoPs can include caches. If certain content is frequently requested across a wide region, then the content may be cached in too many caches across different PoPs, which can be inefficient from a cache resource perspective.

Moreover, in some existing systems, some approaches to minimizing distributed cache utilization for the same content can include maintaining content for a particular distribution at specific point(s) of presence and routing content requests to those PoP(s). For example, a CDN can host one or more distributions (such as video and/or media streaming services). However, for distributions with a large amount of content, maintaining all of the content for a distribution at specific PoP(s) can also be inefficient if the PoP(s)' cache resources are unable to simultaneously hold a sufficient amount of content at the same time to serve the most common content requests directed at a particular distribution. For example, a cache has a limited amount of capacity and too many requests for unique content for a distribution could exceed the cache's capacity and cause significant amounts of cache misses. A cache miss is when the requested content is not in a cache and must be retrieved from storage instead of the cache. The more cache misses, the longer the latency for responses to content requests.

Generally described, aspects of the present disclosure are directed to improved data sharding and routing of content requests to particular PoPs. Each PoP may include a list of several PoPs and a common hashing mechanism. A client computing device may be directed to request content from an initial PoP. The initial PoP can use the content request, the list, and the hashing mechanism to select a PoP. If the selected PoP is the initial PoP, then the initial PoP can service the content request. Otherwise, the initial PoP generates an encoded domain name that includes encoded data indicating the selected PoP. The initial PoP further generates a redirection message that includes at least the encoded domain name and transmits the redirection message to the client computing device. The client computing device requests an Internet Protocol (IP) address for the encoded domain name. A DNS receives the DNS query and can decode the encoded domain name. The DNS can use the PoP identified in the encoded domain name or can override the previously selected PoP. The DNS can look up an IP address for the recently selected PoP (which can be the previously selected PoP or a different PoP) and can send a DNS reply with the IP address to the client computing device. The client computing device can then request content from the PoP identified by the provided IP address.

As described above, some existing systems make routing decisions at the DNS. However, the existing systems may suffer one or more technical deficiencies. For example, data sharding by distribution may be inefficient where the content requested from a distribution exceeds cache capacity, which results in too many cache misses and greater latency. As another example, in existing systems, certain metadata (which can be based on the requested content) is not available in a DNS query. Thus, it is not possible for a DNS server to make certain types of routing decisions based on the metadata described herein. Accordingly, existing systems can lack the ability to shard data at PoPs at the content level and/or lack metadata for making certain routing decisions at the DNS.

Accordingly, the systems and methods described herein may improve computer networking technology. The solutions described herein for sharding content (such as particular resources) at particular PoPs and redirecting requests to those PoPs can improve network cache utilization and, therefore, improve network latency. For example, resources can be sharded at specific PoPs such that respective caches are effectively used, cache misses are reduced, and network latency is reduced. Moreover, certain metadata can be encoded in a domain name that can be used by a DNS to route client computing devices to particular PoPs. Thus, the systems and methods described herein can improve over existing computer networks and/or existing computer networking techniques.

Moreover, the solutions described herein may be inextricably tied to computer networking and encryption technology. For example, as described herein, a domain name label has up to 63 bytes, which can be a limited amount of space for certain kinds of encoding and encryption. The techniques described herein can advantageously encode and encrypt a sufficient amount of data in the limited space of a domain name label to make routing decisions. Thus, the systems and methods described herein can be inextricably tied to computer networking and encryption technology.

Figure 1:
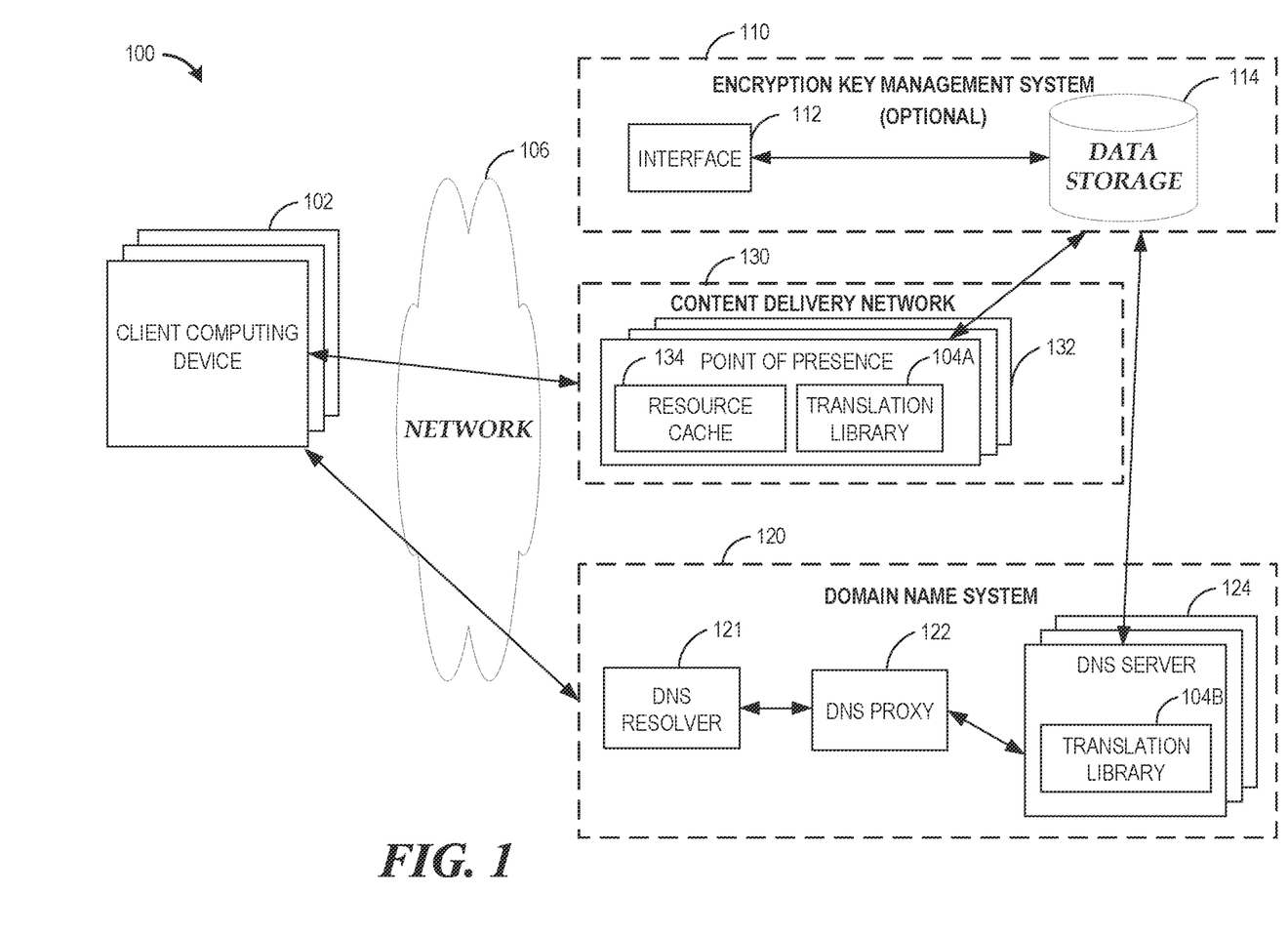
FIG. 1 is a schematic block diagram depicting an illustrative network environment with a Domain Name System, a Content Delivery Network with points of presence, and a client computing device.

Turning to FIG. 1, an illustrative network environment 100 is shown. The network environment 100 may include one or more client computing devices 102, an encryption key management system 110, a Domain Name System (DNS) 120, and a Content Delivery Network (CDN) 130. The encryption key management system 110 may include an interface 112 and a data storage 114. The DNS 120 may include a DNS resolver 121, a DNS proxy 122, and one or more DNS servers 124. The DNS server 124 may include a translation library 104B. The CDN 130 includes PoPss 132. Devices from the PoPs 132 can include a resource cache 134 and a translation library 104A. The constituents of the network environment 100 may be in communication with each other either locally or over a network 106.

As used herein, a "point of presence (PoP)" can refer to collection of devices, such as servers, routers, and/or switches that collectively reflect a demarcation point between two or more networks. As used herein, a "city" can refer to a logical grouping of two or more points of presence. In some embodiments, a city can be a grouping of several PoPs that are located in a common geographic area. In some embodiments, a city of PoPs do not have to be located in the same geographic city and/or multiple cities of PoPs (a logical grouping) can be located in the same geographic city. Other logical groupings may be used. For example, all of the PoPs in the West Coast region of the United States can be logically grouped together.

Example client computing devices 102 can include a laptop or tablet computer, personal computer, personal digital assistant (PDA), hybrid PDA/mobile phone, smart wearable device (such as a smart watch), mobile phone, and/or a smartphone. A user can use an application on the client computing device 102, such as a media player application. The client computing device 102 can communicate with the DNS 120 and the CDN 130. For example, the client computing device 102 can transit a DNS query to the DNS 120. As another example, with an IP address for a device at a PoP from the PoPs 132, the client computing device 102 can request content from the PoP from the PoPs 132. The PoP from the PoPs 132 can be configured to encode a domain name and redirect the client computing device 102 to the encoded domain name.

The DNS server 124 can receive a DNS query via the DNS proxy 122 and the DNS resolver 121. The DNS server 124 can store and/or access DNS records. Example DNS records can include, but are not limited to, CNAME or canonical name DNS records that map an alias name to a canonical domain name and/or wildcard DNS records that can match multiple subdomains. The DNS server 124 can respond to the DNS query with an IP address for a device at a PoP from the PoPs 132. The DNS proxy 122 can route DNS queries. As described herein, the DNS 120 can be a hosted computing environment and the DNS proxy 122 can be responsible for routing DNS queries to different DNS servers 124 in the hosted computing environment.

The encryption key management system 110 can communicate with the translation library 104A, 104B. For example, the translation library 104A can use a counter initialization vector to encrypt data in the domain name label. Each translation library 104A, 104B can be assigned an instance identifier. Each translation library 104A, 104B instance can have a range of counter initialization vectors assigned. If a translation library 104A, 104B is running out of counter initialization vectors, a new key can be assigned to the instance of the translation library 104A, 104B via communication with the interface 112. The assignments of counter initialization vectors to instances and the corresponding encryption keys can be stored in the data storage 114. In other embodiments, the encryption key management system 110 may be omitted. In some embodiments, data may be encoded into the domain name label without encryption. In other embodiments, data may be (i) encrypted and encoded into the domain name label based on a shared secret key and (ii) decrypted and decoded based on the shared secret key. In some embodiments, the shared secret key may be available to devices from the PoPs 132 and the DNS servers 124.

The data storage 114 may be embodied in hard disk drives, solid state memories, any other type of non-transitory computer readable storage medium. The data storage 114 may also be distributed or partitioned across multiple local and/or remote storage devices. The data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP and/or TCP/IP. Protocols and components for communicating via the Internet or any of the other aforementioned types of communication networks are well known to those skilled in the art of computer communications and thus, need not be described in more detail herein.

The client computing devices 102, the encryption key management system 110, the DNS 120, and the CDN 130 may each be embodied in a plurality of devices. The client computing devices 102 and components of the encryption key management system 110, the DNS 120, and the CDN 130 may each include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the client computing devices 102 and components of the encryption key management system 110, the DNS 120, and the CDN 130. The memory generally includes RAM, ROM, and/or other persistent and/or auxiliary non-transitory computer readable storage media.

Additionally, in some embodiments, the encryption key management system 110, the DNS 120, and the CDN 130 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
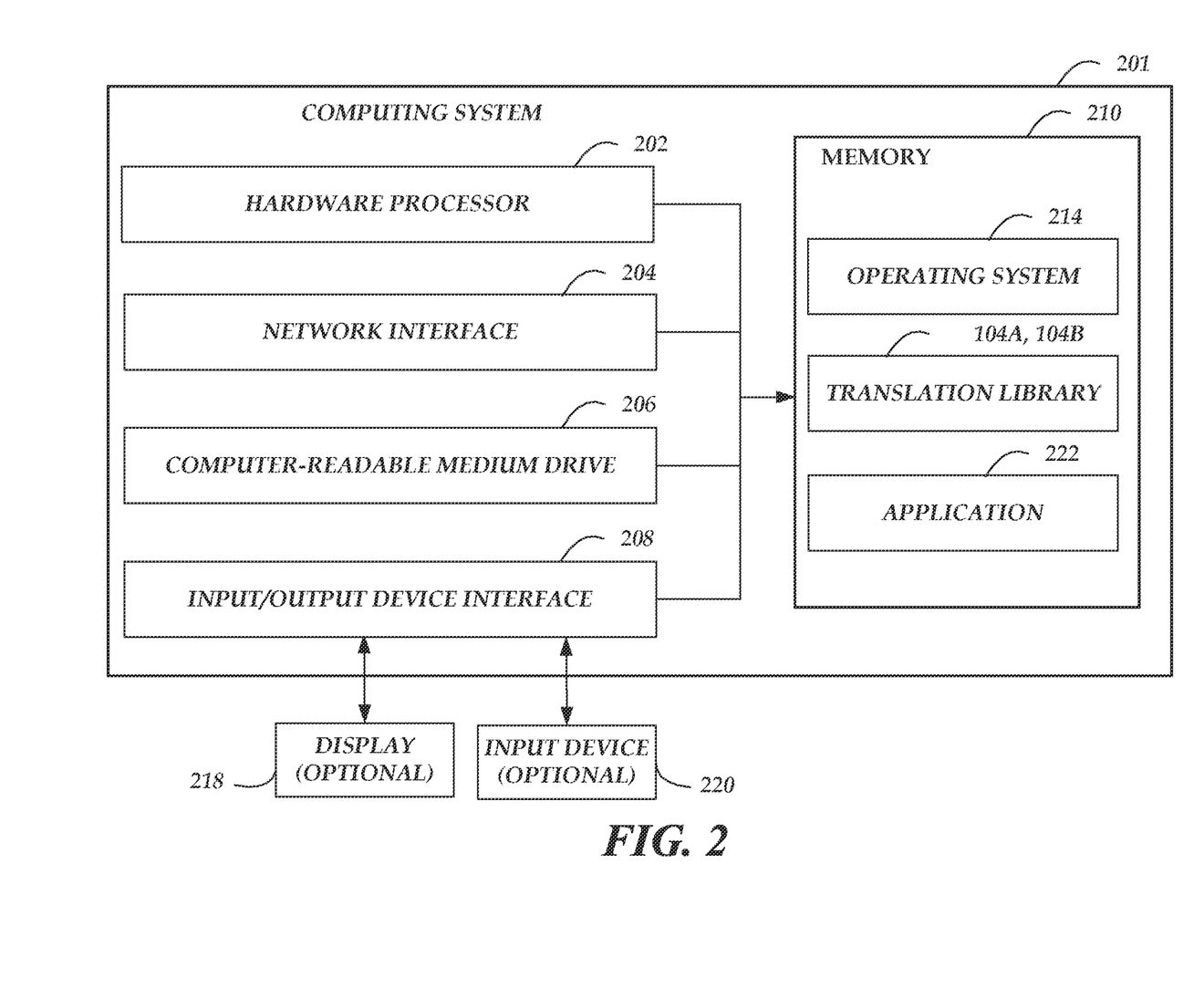
FIG. 2 is a schematic diagram depicting an illustrative general architecture of a computing system for implementing one or more devices referenced in the network environment depicted in FIG. 1.

FIG. 2 is a schematic diagram of an illustrative general architecture of a computing system 201 for implementing a computing device within the PoPs 132 referenced in the environment 100 in FIG. 1. The computing system 201 includes an arrangement of computer hardware and software components that may be used to execute the translation library 104A. While the general architecture of the computing system 201 is shown and described with respect to FIG. 2, the general architecture of FIG. 2 can be used to implement other devices described herein, such as the DNS server 102. The computing system 201 may include more (or fewer) components than those shown in FIG. 2. Further, other computing systems described herein may include similar implementation arrangements of computer hardware and/or software components.

The computing system 201 for implementing a device within the PoPs 132 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 220 may also output audio data to speakers or headphones (not shown).

The memory 210 may contain specifically configured computer program instructions that the hardware processor 202 executes in order to implement one or more embodiments of the client computing device 102. The memory 210 generally includes RAM, ROM and/or other persistent or non-transitory computer-readable storage media. The memory 210 may store an operating system 214 that provides computer program instructions for use by the hardware processor 202 in the general administration and operation of the client computing device 102.

The memory 210 may include an application 222 and the translation library 104A, 104B that may be executed by the hardware processor 202. In some embodiments, application 222 and/or the translation library 104A, 104B may implement various aspects of the present disclosure. In some embodiments, the translation library 104A, 104B may encrypt/encode or decrypt/decode metadata into or from a domain name label. In some embodiments, the application 222 at a PoP could be a network application programmed to serve content and/or generate and send redirection messages. Additionally or alternatively, the application 222 in a DNS server 124 can make routing decisions and send DNS replies based on the routing decisions.

Figure 3A:
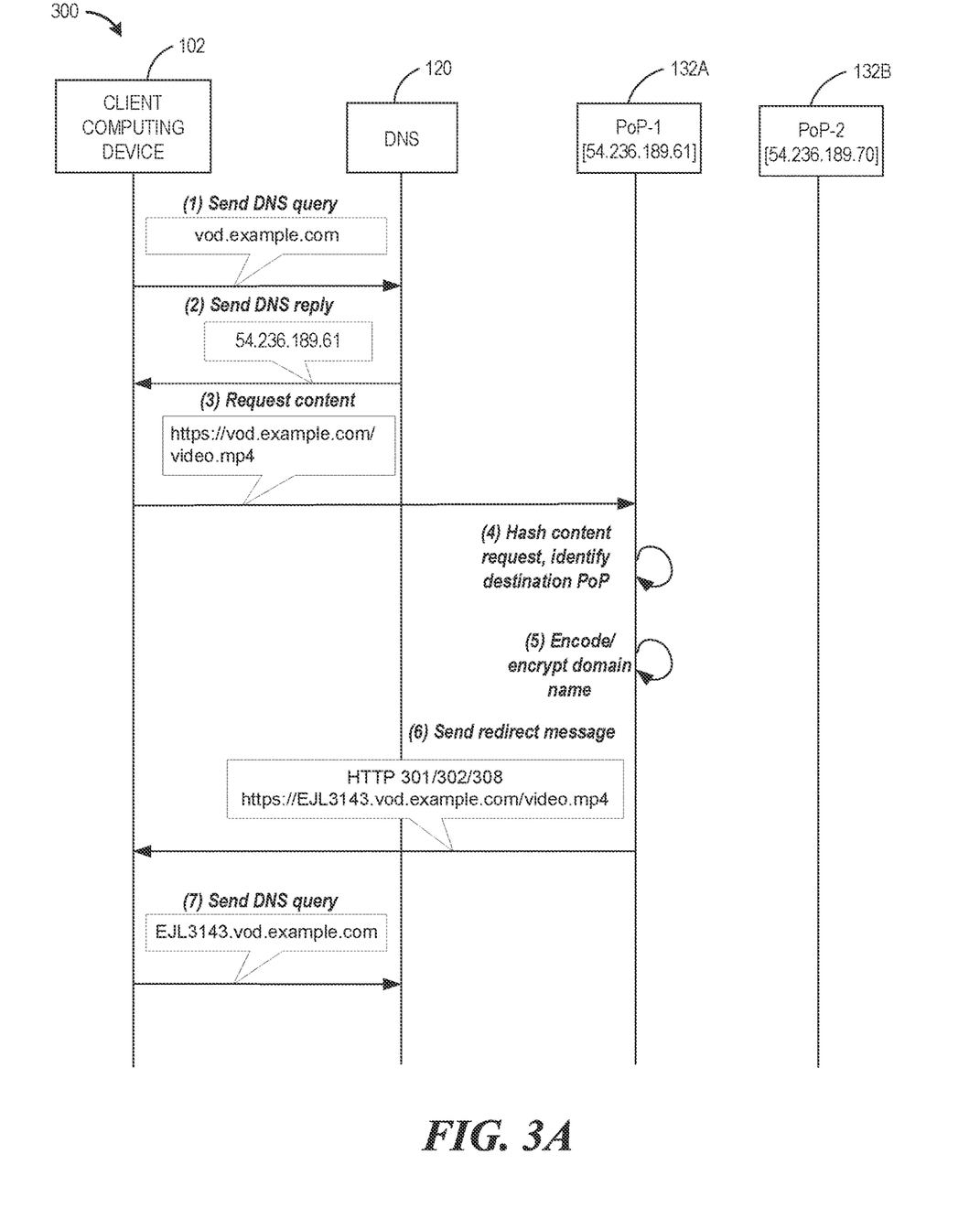
FIGS. 3A-3B are flow diagrams depicting illustrative interactions related to identifying a point of presence, encoding a domain name, sending a redirection message including the encoded domain name, and using the encoded domain name to make a routing decision.
Figure 3B:
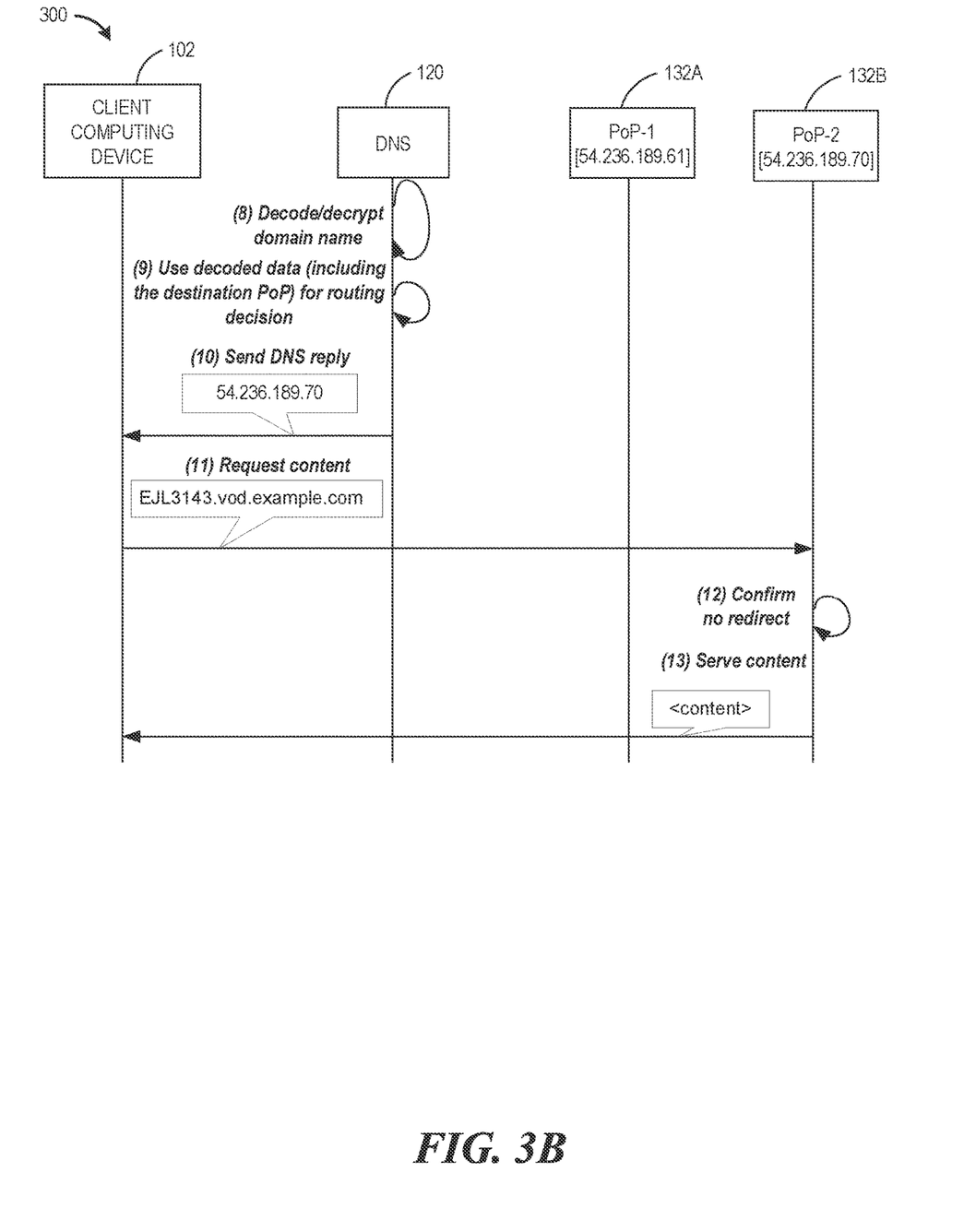

With reference to FIGS. 3A-3B, illustrative interactions are shown related to identifying a PoP, encoding a domain name, sending a redirection message including the encoded domain name, and using the encoded domain name to make a routing decision. The components of the environment 300 of FIGS. 3A-3B can be similar to the components of the environment 100 of FIG. 1. The depicted interactions in FIGS. 3A-3B are example interactions, some or all of which may be optional depending on the circumstances or embodiment. Other interactions (not illustrated) may be possible in accordance with the present disclosure in other embodiments; not every possible communication may be depicted in FIGS. 3A-3B.

Beginning with FIG. 3A and step one (1), the client computing device 102 can send a DNS query that includes a domain name. In this example, the domain name can be "vod.example.com." As described herein, the DNS 120 can receive the DNS query. In particular, the DNS resolver 121 and the DNS proxy 122 can route the DNS query to a DNS server 124. The DNS server 124 can look up a DNS record for the host name portion of the domain name and can resolve the host name to an IP address. The resolution of the IP address can be load balanced in that the DNS server 124 can select from multiple PoPs, which can be based on an approximate geographic location for the client computing device 102 and the PoPs. In this example, the IP address can be resolved to the IP address of a device at the point of presence "PoP-1" 132A. At step two (2), the DNS 120 (and, in particular, the DNS server 124) sends a DNS reply with the IP address. In this example, the IP address can be "54.236.189.61."

At step three (3), the client computing device 102 can send a content request. As illustrated, the example content requested is the resource at "https://vod.example.com/video.mp4". The client computing device 102 can send a content request (such as an HTTP GET request) to the IP address (here "54.236.189.61") that has been resolved to the domain name "vod.example.com". A device at the point of presence "PoP-1" 132A can receive the content request.

At step four (4), the point of presence "PoP-1" 132A can process the content request, which can include applying a hash function to at least some data from the content request. As described herein, the point of presence "PoP-1" 132A can use hashing, such as consistent hashing or rendezvous hashing, to identify a PoP for the content request, which can be referred to herein as the destination PoP. In some embodiments, the point of presence "PoP-1" 132A can apply the hash function to a uniform resource locator (URL) in the content request (such as "https://vod.example.com/video.mp4") that results in a hash value. The point of presence "PoP-1" 132A can using a hashing mechanism, such as consistent hashing or rendezvous hashing, to identify a PoP for the content request. An advantage of the hashing mechanism is that each PoP 132A, 132B can apply the same hashing mechanism to obtain the same result provided the same input. Moreover, the hashing mechanism allows the list of PoPs to be updated and for each of the devices to receive the updated PoPs and have their hashing mechanisms work with the updated lists in a consistent manner. Additional details regarding hashing mechanisms are described in further detail herein, such as with respect to FIGS. 5 and 6.

At step five (5), the point of presence "PoP-1" 132A can encrypt and encode metadata in a domain name label. In some embodiments, the point of presence "PoP-1" 132A can use the translation library 104A to encrypt and encode metadata in the domain name label. In some embodiments, the metadata can include, but is not limited to, the source PoP, the source city, the destination PoP, the destination city, and a hash value of the URL (or the URL for the content request). Additional or alternative data can be stored in the metadata encoded into the domain label. The point of presence "PoP-1" 132A can append the encoded domain name label to the domain name (here the example encoded domain name label is "EAL3123" is appended to the domain name "vod.example.com"). The illustrated encoded domain name label text, "EAL3123," is example text and an encoded domain name label can be up to 63 bytes.

At step six (6), the point of presence "PoP-1" 132A can respond to a request for content with a message redirecting the client computing device 102 to the domain name with the encoded domain name label. As illustrated, the redirection message can be a HTTP redirection message that redirects the client computing device 102 to the URL with the encoded domain name (here "https://EJL3143.vod.example.com/video.mp4"). In some embodiments, the redirection message is an HTTP response with a 301, 308, or 302 status code. In some embodiments, the point of presence "PoP-1" 132A can set a cookie that indicates that the client is being redirected, such as a cookie with the name "redirected" being set to "true." Additionally or alternatively, the point of presence "PoP-1" 132A can use different redirection messages. In some embodiments, the point of presence "PoP-1" 132A provides JavaScript in HTML, content provided in the HTTP response that causes the client computing device 102 to redirect to a URL with the encoded domain name. Additional details regarding encoding domain names are described in further detail herein, such as with respect to FIGS. 4 and 6.

At step seven (7), the client computing device 102 can send a DNS query that includes at least the encoded domain name. As described herein, the DNS 120 can receive the DNS query. In particular, the DNS resolver 121 and the DNS proxy 122 can route the DNS query to a DNS server 124.

Continuing with FIG. 3B and step eight (8), the DNS 120 (and, in particular, the DNS server 124) can decode and decrypt the encoded domain name from the DNS query. In some embodiments, the translation library 104B can decode and decrypt the encoded domain name from the DNS query. The DNS 120 can extract the metadata from the encoded domain name label, such as, but not limited to, the source PoP, the source city, the destination PoP, the destination city, and the hash value for the URL (or the URL for the content request). Additional details regarding decrypting or decoding a portion of the domain name and/or extracting the metadata are described herein, such as with respect to FIGS. 4 and 6.

At step nine (9), the DNS 120 (and, in particular, the DNS server 124) can use the decoded metadata from the encoded domain name to make a routing decision. In some embodiments, the DNS server 124 can select the destination PoP in the metadata and use the IP address for the destination PoP. In some embodiments, the DNS 120 (and, in particular, the DNS server 124) has the capability to override the destination PoP specified in the metadata. In some of those embodiments, the DNS server 124 can determine that the destination PoP is overloaded and specify a different PoP. Additionally or alternatively, the DNS server 124 can determine that the metrics for a particular resource exceed a threshold and can load balance by distributing the requests for the particular resource among several PoPs. In some embodiments, where demand for a resource exceeds a threshold as determined by one or more metrics, the DNS server 124 can select a PoP from among several PoPs in a round robin manner. The DNS server 124 can determine the IP address of the selected PoP. Additional details regarding the DNS 120 determining the PoP are described in further detail below with respect to FIG. 6.

At step ten (10), the DNS 120 (and, in particular, the DNS server 124) can send a DNS reply to the client computing device 102 with the IP address of the selected point of presence "PoP-2" 132B in response to the DNS query. In this example, the IP address of the point of presence "PoP-2" 132B is "54.236.189.70". At step eleven (11), the client computing device 102 can request content from the IP address of the point of presence "PoP-2" 132B. In some embodiments, the content request can be an HTTP GET request.

At step twelve (12), before serving content, the point of presence "PoP-2" 132B can confirm that no further redirection is required. In some embodiments, if the previous redirect response set a cookie with a value indicating a redirect (such as "redirect=true"), then the point of presence "PoP-2" 132B can check the cookie and determine that client computing device 102 has been redirected. Accordingly, the point of presence "PoP-2" 132B does not check whether there should be further redirection, such as by applying the hashing mechanism at step four (4) of FIG. 3A. In some embodiments, this type of check may be necessary to prevent unnecessary loops (possibly infinite) where PoPs keep erroneously redirecting.

Accordingly, at step thirteen (13), the point of presence "PoP-2" 132B can serve content to the client computing device 102. Since the point of presence "PoP-1" 132A (and/or the DNS 120 in other cases) determined that the other point of presence "PoP-2" 132B should be the authoritative source for the particular content request (such as all content requests for the specified URL), the resource for the content request has effectively been sharded at the point of presence "PoP-2" 132B since the corresponding object can be cached at that PoP 132B. Advantageously, the point of presence "PoP-1" 132A can free up its cache for that particular resource and does not need to store the requested content. Thus, the PoP 132A (and/or the DNS 120 in some cases) are capable of making routing decisions and/or sharding content at the PoP level.

Figure 4:
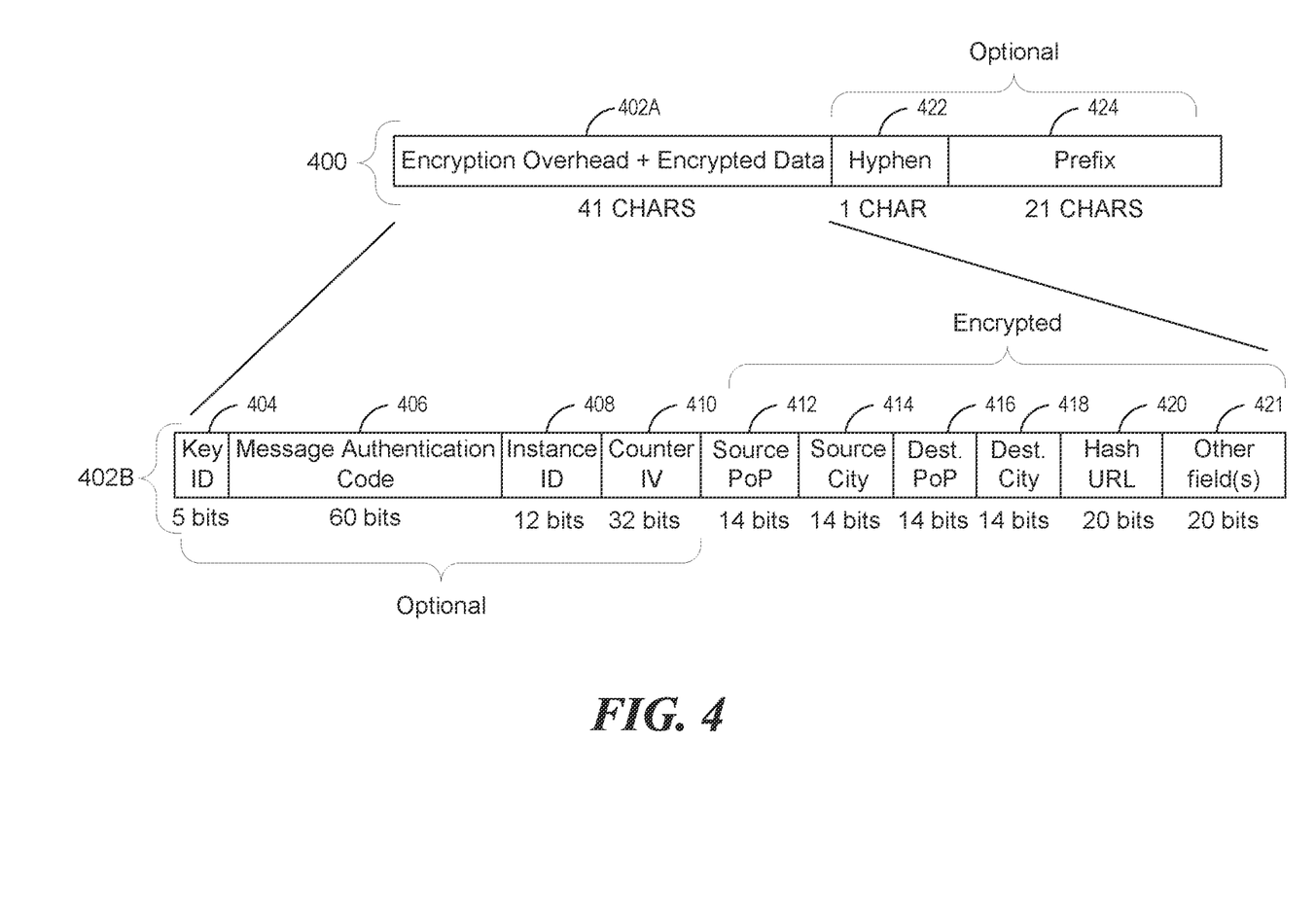
FIG. 4 is a schematic diagram depicting an illustrative encoding and encryption format for a domain name label.

FIG. 4 is a schematic diagram depicting an illustrative encoding and encryption format for a domain name label.

The example representation block 400 depicts a domain name label. As described herein, a domain name label can be up to 63 characters, where each character is one (1) byte. The first portion 402A of the domain name label can include the encryption overhead and the encrypted data. In some embodiments, since some CDN implementations may not use aliases, a second portion 422, 424 of the domain name label can be reserved for a delimiter (here the hyphen character "-") and a prefix 424, such as a distribution DNS name. As shown, one example allocation of the 63 characters for the example format is to use 41 characters for (i) the encryption overhead and the encrypted data and (ii) the remaining 22 characters (one character being for a delimiter) can be allocated to the delimiter 422 and the prefix 424. As shown, the 41 characters for the portion 402A, with a base-32 encoding, can result in 205 bits available for encryption overhead and the encrypted data portion 402A.

Different allocations of the 63 bytes can be used depending on the embodiment. For example, some embodiments may not allocate a portion of the domain name label for a prefix and/or may allow a client to omit a prefix portion of the domain name label. Therefore, while not illustrated in FIG. 4, the encryption overhead and encrypted data portion 402A (or just the encrypted data portion 402A) can take up to 63 bytes of the domain name label in some embodiments. In other embodiments, the domain name label may not be encrypted.

The example representation block 402B depicts the first portion 402A of the domain name label in further detail. As shown, a portion of the representation block 402B may not be encrypted, such as the fields used for the encryption overhead. The representation block 402B can include a key identifier 404. The key identifier 404 can indicate to the receiving party, which particular secret key was used by the translation libraries 104A, 104B. The representation block 402B can include an instance identifier 408. In some embodiments, each translation library 104A, 104B can have a distinct instance identifier 408 that can be associated with a particular range of counter initialization vectors that can be used for encryption purposes.

The representation block 402B can further include a counter initialization vector 410. In some embodiments, the counter initialization vector 410 can be used for encrypting metadata using an algorithm, such as, but not limited to, Advanced Encryption Standard (AES) Counter Mode algorithm for encrypting data. The example representation block 402B can further include a message authentication code 406. An example message authentication code 406 can be generated with a hash-based message authentication code (HMAC) algorithm, such as HMAC-SHA256. In some embodiments, the HMAC can be computed on the counter initialization vector 410 and the cyphertext generated for the encrypted portion 412, 414, 416, 418, 420, 421. The message authentication code 406 can be used to verify the integrity and authenticity of a message and verify that those portions of the domain name have not been tampered. Tampering is a concern because DNS queries, HTTP messages, and other messages with encoded domain names can be transmitted over networks with many intermediary nodes where attempted tampering could occur.

The encrypted portion 412, 414, 416, 418, 420, 421 of the representation block 402B can include metadata. In some embodiments, the metadata can include a source PoP 412 and/or a destination PoP 416. In some embodiments, the metadata can further include a source city 414 and a destination city 418. In other embodiments, the source city 414 and the destination city 418 may be omitted from the block 402B and/or may be optional. The metadata can include a hash of the URL 420. The metadata can further include other fields 421. While not illustrated, in some embodiments, the other fields 421 can include a version of the translation library. The version of the translation library can be further indicated by a library version, which can be use by the receiving translation library to properly decrypt and decode the encoded domain.

In some embodiments, the unencrypted fields 404, 406, 408, 410 may be omitted. As described herein, a shared secret key may be used to encrypt the encrypted portion 412, 414, 416, 418, 420, 421 of the representation block 402B. In some embodiments, the fields 404, 406, 408, 410, 412, 414, 416, 418, 420, 421 in the domain name label 400 can be different. Alternative fields or fields of different lengths can be used in the domain name label 400. For example, while not illustrated in FIG. 4, a client device type identifier can be included in the metadata portion of the domain name label.

Figure 5:
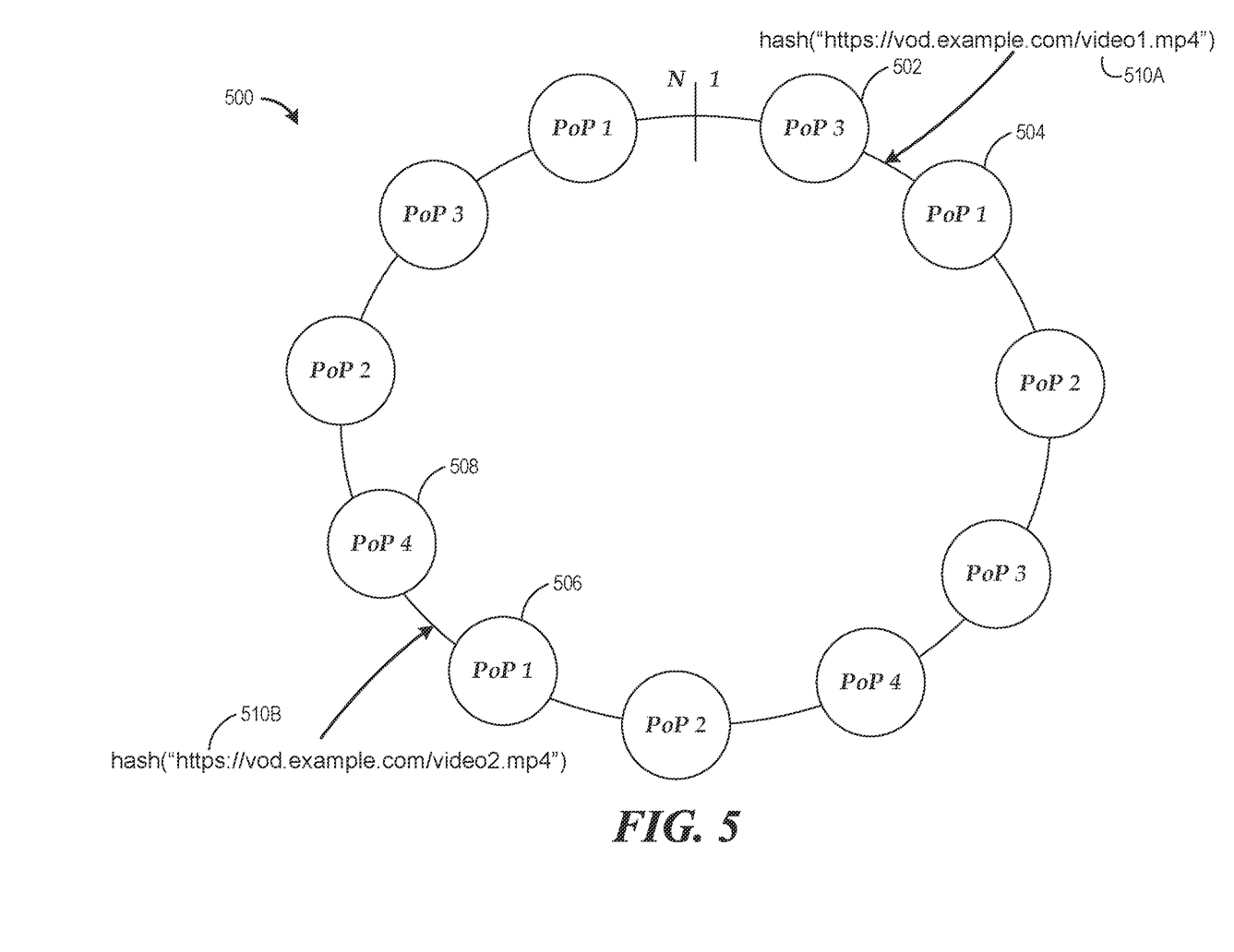
FIG. 5 is a schematic diagram depicting an illustrative hashing mechanism and a consistent hash ring.

FIG. 5 is a schematic diagram depicting an illustrative hashing mechanism and a consistent hash ring 500. As depicted, the consistent hash ring 500 includes nodes 502, 504, 506, 508. Each node 502, 504, 506, 508 can represent a PoP. The consistent hash ring 500 can be used to distribute content requests across the points of presence corresponding to the nodes 502, 504, 506, 508 of the consistent hash ring 500.

As an initial matter, as illustrated, the hashing function "hash( )" can receive a text string as input and output a hash value (here a number). In some embodiments, the output of the hash function can be from 1 to N. The content requests can be mapped to subranges between 1 and N to evenly distribute the requests. In the example, N can be 256; therefore, in the consistent hash ring 500, each subrange can cover 21 or 22 hash values. Therefore, in the consistent hash ring 500 where N is 256, a first hash value between 1 and 21 could be mapped to "PoP 3" node 502, a second hash value between 22 and 42 could be mapped to "PoP 1" node 504, and so forth. As shown, the hash value of the first hash 510A of the URL "https://vod.example.com/video1.mp4" falls into the subrange between the "PoP 3" node 502 and the "PoP 1" node 504 and is assigned to "PoP 1" node 504. In another example, the hash value of the second hash 510B of the URL "https://vod.example.com/video2.mp4" falls into a different subrange between the other "PoP 1" node 506 and a "PoP 4" node 508 and is assigned to the "PoP 4" node 508. In some embodiments, the hashing function can be used to generate a hash value from a content request using additional or alternative data from the content request other than the URL.

An advantage of consistent hashing and other distributed hashing mechanisms is that each distributed device implementing the hashing mechanism can get the same results given the same input. Moreover, as nodes are added or removed, each device implementing the hashing mechanism can add or remove nodes and again get the same results given the same input. In some embodiments where consistent hashing is used, the implementation of consistent hashing may vary depending on the embodiment. In some embodiments, a consistent hashing ring can be generated with the following steps: start with an empty data structure that can be sorted (such as a list); given the name of a PoP, hash the PoP name to get back a numerical value; insert the numerical value into the data structure in sorted order, and save the PoP name somewhere; if a PoP is removed, simply remove it from its current location in the data structure; if a PoP is added, place its hash value in sorted order with the older PoP's hash in the data structure; and given a key (such as a URL), compute its hash, and use a variation of binary search to find the PoP with the nearest hash. In some implementations of the consistent hash ring 500 of FIG. 5, each node is associated with multiple subranges, instead of each node being associated with a single range. In these embodiments, virtual nodes can be used and whenever a node is added or removed, the mapping from virtual nodes to nodes can be updated.

In other embodiments, a different hashing mechanism can be used instead of a consistent hashing. In some embodiments, a hashing mechanism such as rendezvous hashing may be used. An advantage of the rendezvous hashing embodiments, much like the consistent hashing embodiments, is that each device implementing rendezvous hashing can get the same results provided the same input. In some embodiments, rendezvous hashing can be implemented by generating a randomly (or pseudo-randomly) sorted list of points of presence for each key (such as a URL) and the first PoP in the list is chosen. In these embodiments, to get the randomly (or pseudo-randomly) sorted list of PoPs for each key, each PoP name can be concatenated with each key and is hashed to get hash values, and the PoPs are sorted based on the hash values. So long as the devices implementing the rendezvous hashing receive the same additions or removals of PoPs, then each device can get the same hash results given the same input. For example, in some embodiments, if a PoP is removed or is offline, then the device implementing the rendezvous hashing can simply skip that PoP in the sorted list. If there are addition(s) of PoPs, the new PoP name can be hashed with the respective key and added to the sorted list.

Figure 6:
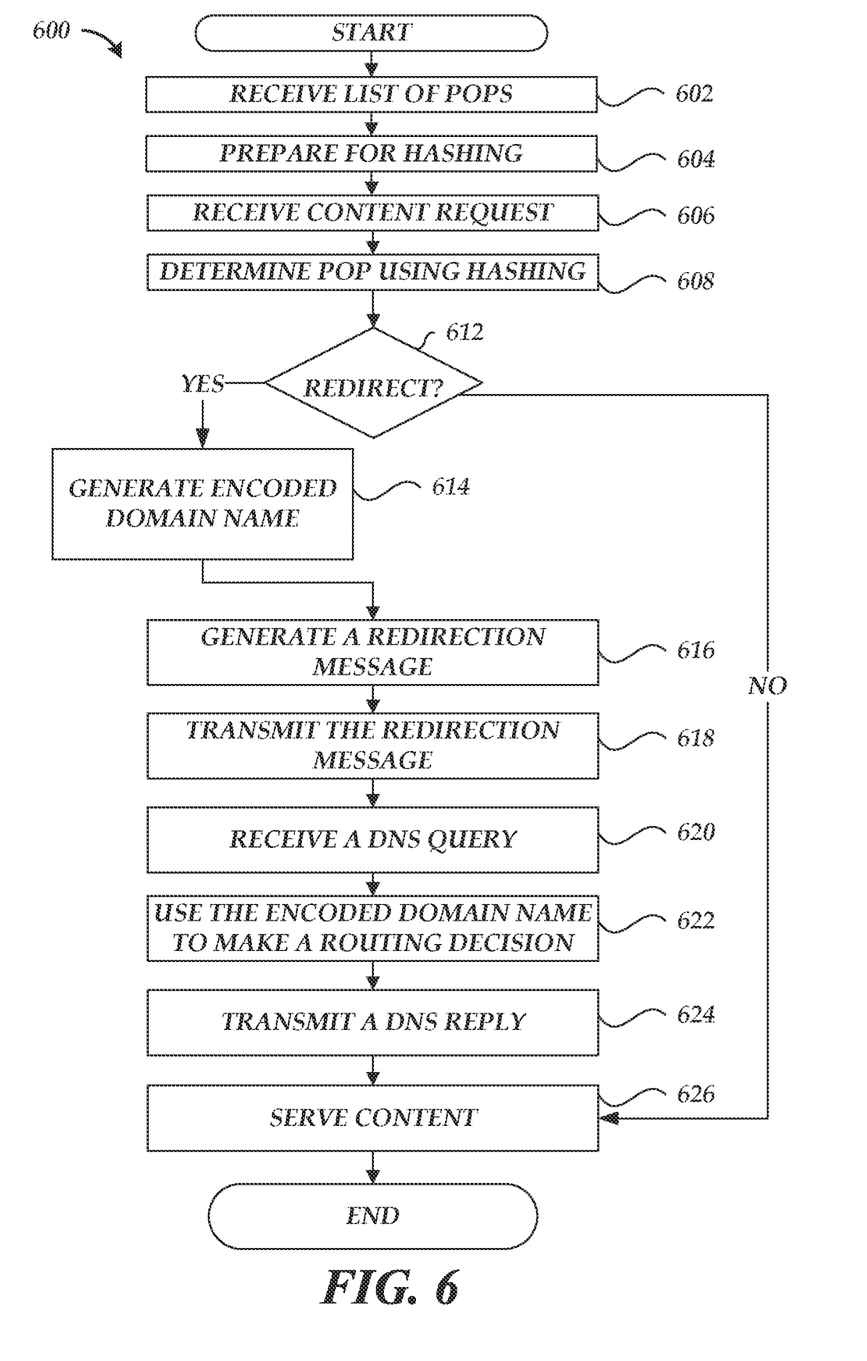
FIG. 6 is a flow chart depicting an example method including identifying a point of presence, encoding a domain name, using the encoded domain name to make a routing decision, and serving content.

FIG. 6 is a flow diagram depicting an example method 600 implemented by various devices, such as a device from the PoPs 132 and/or the DNS server 124 for encoding domain names and using the encoded domain names to make routing decisions. In some embodiments, the device from the PoPs 132 and/or the DNS server 124 may include the translation library 104A, 104B and/or the application 222 each of which may implement aspects of the method 600.

Beginning at block 602, a list of points of presence can be received. Each PoP from the PoPs 132 can each receive the list. Each DNS server 124 may receive a list. In some embodiments, each PoP in a logical grouping, such as a city, may receive a list of all of the PoPs in that logical grouping. In some embodiments, each DNS server 124 may receive one or more lists of PoPs, where each list can be for a particular logical grouping of PoPs.

At block 604, there can be preparation for hashing. In some embodiments, each PoP from the PoPs 132 and/or the DNS server 124 can prepare for hashing. As described herein, a distributed hashing mechanism can be used so that each of the devices implementing the mechanism can get the same results given the same input. In some embodiments, each of the devices may generate a consistent hash ring from the list of points of presence. Each device may use a data structure, hash an identifier (such as the PoP name) for each PoP from the list, and add the hashed value to the data structure in sorted order. Additionally or alternatively, virtual nodes can be used with the data structure if subranges are desired to be used in the consistent hash ring. In other embodiments, instead of a consistent hash ring, each of the devices can use rendezvous hashing. In those embodiments, to the extent the input keys are known ahead of time (such as the URLs available in a CDN), the input keys can each be concatenated with each identifier (such as a name) for the points of presence, and then the list of hashed values for each key can be sorted. In these embodiments, there is a mapping between respective points of presence and hash values. In some embodiments, the devices applying the hashing can use a hash function such as, but not limited to, SHA-256. In other embodiments, different hash functions can be used. Additional details regarding hashing mechanisms are described above with respect to FIG. 5. In some embodiments, updates to the list of PoPs can be received by the devices implementing the hashing mechanisms. The data structures underlying the hashing mechanisms can be updated accordingly, as described herein. For example, PoPs can be added or removed for use by the hashing mechanisms.

At block 606, a content request can be received. In some embodiments, a first PoP from the PoPs 132 can receive a content request from a client computing device 102. The content request can include a Uniform Resource Locator (URL). In some embodiments, the content request is an HTTP GET message. The content request can include a domain name. In some embodiments, a portion of the URL includes the domain name. The content request can include a unique identifier for a resource. Before content is retrieved, such as from a resource cache, the PoP can determine whether it or another PoP should handle the content request.

At block 608, a PoP can be determined using hashing. In some embodiments, a first PoP from the PoPs 132 can initially determine the PoP that should handle the content request by hashing some data from the content request (such as the URL in the content request). The first PoP from the PoPs 132 can apply a hash function to at least some data from the content request (such as the URL or a unique identifier for a resource) that results in a hash value. In some embodiments, the devices applying the hash function can use a hash function such as, but not limited to, SHA-256. In other embodiments, different hash functions can be used.

The first PoP from the PoPs 132 can determine, based on (i) the list of points of presence and (ii) the hash value, a second PoP. In some embodiments, the first PoP can determine, based on the mapping between points of presence and hash values, that a second PoP from the PoPs 132 from the list maps to the hash value. As described herein, the second PoP can be determined using a consistent hash ring, rendezvous hashing, or some other hashing mechanism. The first PoP can identify, from the consistent hash ring or via a rendezvous hashing algorithm, that the hash value is associated with the second PoP.

At block 612, it can be determined whether the client computing device 102 should be redirected. As described herein, the determined second PoP may be the same as the PoP that received the content request. In some embodiments, the PoP determines, based on the mapping between points of presence and hash values, that the PoP that received the request maps to the hash value. In other cases, the second PoP may be different from the PoP that initially receives the content request. If, based on the hashing, the PoP that received the content request determines that it should process the request, then the method 600 proceeds to block 626 to serve content. Otherwise, the first PoP initially determined, based on the hashing, that a second PoP should handle the request, and the method 600 proceeds to block 614 for generating an encoded domain name.

At block 614, an encoded domain name can be generated. The PoP 132 that received the content request can encode a domain name. As described herein, the metadata that can be encoded in the domain name can include an identifier for the destination PoP (such as the PoP that was determined to be redirected towards) and the hash value that was generated.

In some embodiments, the translation library 104A can encrypt (i) an identifier for a source PoP, (ii) the identifier for the destination PoP, and (iii) the hash value in a portion of the encoded domain name. The hash value can identify a resource requested by the content request from the client computing device 102. In some embodiments, the metadata can further include the source city and/or the destination city. In some embodiments, the metadata fields can be encoded using base-10, base-32, or base-64 encoding. The device can apply a shared secret key in an encryption algorithm. In some embodiments, the metadata fields can be encrypted using a shared secret key among the devices, including devices from the PoPs 132. The translation library 104A can generate the encoded domain name by combining at least the encoded portion along with the rest of the original domain name. In some embodiments, if there is not an alias for the domain name, the translation library 104A can generate the encoded domain name by combining at least the encoded portion, the prefix portion of the original domain name as delimited, and along with the rest of the original domain name. Additional details regarding generating an encoded domain name are described herein, such as with respect to FIGS. 3A, 3B, 4.

In other embodiments, different encoding and encryption techniques can be used. The translation library 104A, 104B can derive multiple keys from an original key. The translation library 104A, 104B can derive, from the original key and salt, at least two keys. At least one of the keys, an encryption key, can be used for encryption. At least one other key, the cryptographic key, can be used for the message authentication code. In some embodiments, an algorithm for deriving multiple encryption keys can include the HMAC key derivation function. In some embodiments, the HKDF algorithm extracts a pseudorandom key using an HMAC hash function (e.g., HMAC-SHA256) on an optional salt (acting as a key) and the input key, the original key, acting as data.

A counter can be initialized for encryption. Counters can include, but are not limited to, arbitrary numbers and can be referred to as counter initialization vectors. Each instance of the translation library 104A, 104B can be associated with a range of counter initialization vectors. The translation library 104A, 104B can select a new counter initialization vector from within the range available for the instance, which can be calculated by incrementing a previous counter initialization vector. The encryption key management system 110 can assign the ranges to particular instances of the translation library 104A, 104B to ensure that each counter initialization vector used for encryption is unique. If an instance begins to run out of counter initialization vectors, the encryption key management system 110 can assign a new key to the instance.

Cyphertext can be generated. The translation library 104A can generate the cyphertext using an encryption algorithm, such as an AES counter mode encryption. In some embodiments, the translation library 104A generates some random bits with the encryption key and the counter initialization vector; the translation library 104A XORs the random bits with the input text to generate the cyphertext, which is randomized text. In the counter mode, the counter initialization vector can be incremented with each use. The translation library 104A can encrypt the metadata received as input. Additional details regarding example fields that can be encrypted are described in further detail herein, such as with respect to FIG. 4 discussed above.

A message authentication code can be computed. In some embodiments, the translation library 104A can compute the message authentication code from at least the cyphertext. The translation library 104A can generate a message authentication code with a hash-based message authentication code (HMAC) algorithm, such as HMAC-SHA256. The translation library 104A can compute the message authentication code at least by applying a cryptographic hash function to the cyphertext and the cryptographic key. In some embodiments, the translation library 104A generates the cyphertext further by at least encrypting the metadata using the encryption key and the counter initialization vector. The message authentication code can be used to verify that at a least a portion of the encoded domain name has not been tampered.

If there is not an alias for the domain name, the translation library 104A can generate the encoded domain name by combining at least the message authentication code, the cyphertext, and the prefix portion of the original domain name as delimited, and along with the rest of the original domain name. If there is an alias, the translation library 104A can generate the encoded domain name by combining at least the message authentication code, the cyphertext, and the domain name. In some embodiments, the instance of the translation library 104A has an identifier and the generating the encoded domain can include combining the instance identifier with the message authentication code, the cyphertext, and the domain name. The translation library 104A can make sure that the encoded data fits within the 63 bytes limit of a domain name label. Additional details regarding combining the domain name to result an encoded domain name are described herein, such as with respect to FIGS. 3A, 3B, 4.

At block 616, a redirection message can be generated. The PoP from the PoPs 132 can generate the redirection message that includes at least the encoded domain name. The redirection message can be configured to cause the client computing device 102 to request an IP address for the encoded domain name. In some embodiments, the PoP generates an HTTP response that includes at least a 301 status code, a 302 status code, or a 308 status code. In some embodiments, the PoP adds a cookie to the redirection message. The cookie can indicate a redirection of the client computing device 102. The PoP can add a cookie with the name "redirected" being set to "true." Subsequent requests for content from the client computing device 102 can include the cookie.

In other embodiments, the PoP can generate a redirection message that includes a JavaScript instruction configured to cause the client computing device 102 to request the IP address for the encoded domain name. The JavaScript instruction, "window.location.href='https://EJL3143.vod.example.com/video.mp4'" or "window.location.replace='https://EJL3143.vod.example.com/video.mp4'", can cause the client computing device 102 to request the IP address for the encoded domain name, such as by issuing a DNS query for the domain name. In some embodiments, instead of using a cookie, the redirection message can include a URL parameter, such as "redirection=true," that can be passed to the destination server.

At block 618, the redirection message can be transmitted. In some embodiments, the PoP from the PoPs 132 can transmit the redirection message to the client computing device 102. In response to receiving the redirection message, the client computing device 102 can request content from the redirected destination. As described herein, that can include the client computing device 102 sending a DNS query for the encoded domain name.

At block 620, a DNS query can be received. In some embodiments, the DNS server 124 can receive the DNS query that includes at least the encoded domain name. At block 622, the encoded domain name can be used to make a routing decision. In some embodiments, the DNS server 124 (via the use of the translation library 104B) decrypts and decodes, from the encoded domain name, the identifier for the previously identified PoP. In some embodiments, the translation library 104B uses the shared secret key to decrypt the metadata in the encoded domain name label. As described herein, the metadata can include, but is not limited to, the previously identified PoP (also referred to herein as the destination PoP), the source PoP, the destination city, the source city, and/or the hash value. In some embodiments, the translation library 104B, using the information from the domain name label, can verify the integrity of the contents of the domain name label and decrypt and decode the domain name label. The translation library 104B at the DNS 120 can have the same secret key and using the counter initialization vector can decrypt and then decode the metadata. The DNS server 124 identifies an IP address associated with the previously identified PoP.

Additionally or alternatively, the DNS server 124 can apply other routing logic. Based on at least the encoded metadata in the domain name, the DNS server 124 can determine that the previously identified PoP should not receive a content request. In this manner, the DNS server 124 can override the previous decision from the first PoP from the PoPs 132. The DNS server 124 can determine that the previously identified PoP is unavailable or that a performance metric for the sec previously identified PoP exceeds a threshold. For example, the second PoP may be temporarily down or may be experience a high volume of requests. In some embodiments, the DNS server 124 can perform further redirection or load balancing by selecting another PoP to satisfy the request. In some embodiments, the DNS server 124 can select an alternative PoP from the same city as the destination city in the metadata. The DNS server 124 can identify an IP address for the alternative PoP.

Additional or alternative routing logic can be based on the requested resource. In some embodiments, the DNS server 124 has access to metrics such as requests per second or bits per second per resource. The metrics can be updated or monitored in substantially real time. The DNS server 124 can identify a metric associated with the resource as identified by the hash value and determine whether the metric exceeds a threshold. If the metric exceeds the threshold, the DNS server 124 can select an alternative PoP as described herein.

At block 624, a DNS reply can be transmitted. The DNS server 124 can send a DNS reply to the client computing device 102 with an IP address. As described herein, the IP address can be for the selected PoP, which could be the PoP specified as the destination PoP in the metadata or an alternative PoP. As described herein, the client computing device 102 can receive the DNS reply with the IP address and subsequently request content from that IP address. In some embodiments, the PoP at the specified address can receive the subsequent content request. The content request can be an HTTP GET request with the provided IP address as the destination address. The second content request can include the cookie. The second PoP at the specified address can identify the cookie from the second content request that indicates that the client computing device 102 has been redirected. In other embodiments, the second PoP can identify that the client computing device 102 has already been redirected, such as by checking a URL parameter that "redirected=true." As described herein, this redirection variable can be helpful to prevent the second PoP from itself checking whether it should handle the request and sending another redirect message, which could result in unnecessary or erroneous redirection loops.

At block 626, the content can be served. The PoP can retrieve content based on the content request and transmit the content (such as a resource) to the client computing device 102. As described herein, many such content requests for a particular resource can be directed to the same PoP or PoPs, which can advantageously result in improved cache and network performance.

While many of the embodiments described herein use Uniform Resource Locators (URLs), many of those embodiments can function in the same manner by using Uniform Resource Identifiers (URIs).

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for routing network traffic, the computer-implemented method comprising:
    under control of a computer hardware processor configured with specific computer executable instructions,
        receiving, at a first point of presence, a list of a plurality of points of presence;
        receiving, from a first client computing device and at the first point of presence, a first content request including at least a first Uniform Resource Locator (URL);
        applying a hash function to at least the first URL that results in a first hash value;
        determining, based on a mapping between points of presence and hash values, that a second point of presence from the list maps to the first hash value;
        generating an encoded domain name based on an identifier for the second point of presence;
        generating a redirection message including at least the encoded domain name;
        transmitting, to the first client computing device, the redirection message configured to cause the first client computing device to request an Internet Protocol address for the encoded domain name;
        receiving, from a second client computing device and at the first point of presence, a second content request including at least a second URL;
        applying the hash function to at least the second URL that results in a second hash value;
        determining, based on the mapping between points of presence and hash values, that the first point of presence maps to the second hash value;
        retrieving content for the second content request; and
        transmitting the content to the second client computing device.

2. The computer-implemented method of claim 1, wherein generating the redirection message further comprises:
    adding a cookie to the redirection message, wherein the cookie indicates a redirection of the first client computing device.

3. The computer-implemented method of claim 2, further comprising:
    receiving, from the first client computing device and at the second point of presence, a third content request;
    identifying, from the third content request, the cookie that indicates that the first client computing device has been redirected;
    retrieving content for the third content request; and
    in response to identifying the cookie, transmitting the content for the third content request to the first client computing device.

4. The computer-implemented method of claim 1, further comprising:
    receiving, from the first client computing device and at a DNS server, a DNS query including at least the encoded domain name;
    decrypting and decoding, from the encoded domain name, the identifier for the second point of presence;
    identifying an Internet Protocol address associated with the second point of presence; and
    transmitting, to the first client computing device, a DNS reply that includes at least the Internet Protocol address.

5. The computer-implemented method of claim 1, wherein the redirection message is an HTTP response that includes at least a 301 status code, a 302 status code, or a 308 status code.

6. A system comprising:
a data storage medium; and
a first computer hardware processor of a first point of presence in communication with the data storage medium, wherein the first computer hardware processor is configured to execute computer-executable instructions to at least:
receive a list of a plurality of points of presence;
receive, from a first client computing device, a first content request;
apply a hash function to at least some data from the first content request that results in a first hash value;
determine, based on a mapping between points of presence and hash values, that a second point of presence from the list maps to the first hash value;
generate an encoded domain name based on an identifier for the second point of presence;
generate a redirection message including at least the encoded domain name;
transmit, to the first client computing device, the redirection message configured to cause the first client computing device to request an Internet Protocol address for the encoded domain name;
receive, from a second client computing device, a second content request including at least a second URL;
apply the hash function to at least the second URL that results in a second hash value;
determine, based on the mapping between points of presence and hash values, that the first point of presence maps to the second hash value;
retrieve content for the second content request; and
transmit the content to the second client computing device.

7. The system of claim 6, further comprising:
a second computer hardware processor of a DNS server, wherein the second computer hardware processor is configured to execute further computer-executable instructions to at least:
receive, from the first client computing device, a DNS query including at least the encoded domain name;
decrypt and decode, from the encoded domain name, the identifier for the second point of presence;
determine that the second point of presence should not receive a content request;
identify an Internet Protocol address associated with a third point of presence different from the second point of presence; and
transmit, to the first client computing device, a DNS reply that includes at least the Internet Protocol address.

8. The system of claim 7, wherein to determine that the second point of presence should not receive a content request, the second computer hardware processor is configured to execute additional computer-executable instructions to at least:
determine that the second point of presence is unavailable or that a performance metric for the second point of presence exceeds a threshold.

9. The system of claim 6, wherein to generate the encoded domain name, the first computer hardware processor is configured to execute further computer-executable instructions to at least:
encrypt the identifier for the second point of presence and the first hash value, wherein the first hash value identifies a resource requested by the first content request.

10. The system of claim 9, further comprising:
a second computer hardware processor of a DNS server, wherein the second computer hardware processor is configured to execute additional computer-executable instructions to at least:
receive, from the first client computing device, a DNS query including at least the encoded domain name;
decrypt and decode, from the encoded domain name, the identifier for the second point of presence and the first hash value;
identify a metric associated with the resource as identified by the first hash value;
determine that the metric exceeds a threshold;
identify an Internet Protocol address associated with a third point of presence different from the second point of presence; and
transmit, to the first client computing device, a DNS reply that includes at least the Internet Protocol address.

11. The system of claim 10, wherein the metric associated with the resource is requests per second or bits per second.

12. The system of claim 6, wherein the at least some data from the first content request includes a unique identifier for a resource.

13. A system comprising:
a data storage medium; and
a computer hardware processor in communication with the data storage medium, wherein the computer hardware processor is configured to execute computer-executable instructions to at least:
receive a list of a plurality of points of presence;
receive, from a first client computing device, a first content request;
apply a hash function to at least some data from the first content request that results in a first hash value;
determine, based on (i) the list of the plurality of points of presence and (ii) the first hash value, a first point of presence;
generate an encoded domain name based on an identifier for the first point of presence;
generate a redirection message including at least the encoded domain name;
transmit, to the first client computing device, the redirection message configured to cause the first client computing device to request an Internet Protocol address for the encoded domain name;
receive, from a second client computing device, a second content request;
apply the hash function to at least some data from the second content request that results in a second hash value;
determine, based on (i) the list of the plurality of points of presence and (ii) the second hash value, a second point of presence;
retrieve content for the second content request; and
transmit the content to the second client computing device.

14. The system of claim 13, wherein the at least some data from the first content request includes a Uniform Resource Locator (URL).

15. The system of claim 13, wherein the computer hardware processor is configured to execute further computer-executable instructions to at least:

generate a consistent hash ring from the list of the plurality of points of presence, wherein to determine the first point of presence, the computer hardware processor is configured to execute the further computer-executable instructions to at least:
  identify, from the consistent hash ring, that the first hash value is associated with the first point of presence.

16. The system of claim 13, wherein to determine the first point of presence, the computer hardware processor is configured to execute further computer-executable instructions to at least:
  apply a rendezvous hashing algorithm to the first hash value and the list of the plurality of points of presence.

17. The system of claim 13, wherein to generate the encoded domain name, the computer hardware processor is configured to execute further computer-executable instructions to at least:
  encrypt the identifier for the first point of presence and the first hash value in a portion of the encoded domain name, and wherein the portion of the encoded domain name is up to 63 bytes.

18. The system of claim 13, wherein to generate the encoded domain name, the computer hardware processor is configured to execute further computer-executable instructions to at least:
  encrypt (i) an identifier for a source point of presence, (ii) the identifier for the first point of presence, and (iii) the first hash value in a portion of the encoded domain name.

19. The system of claim 18, wherein to generate the encoded domain name, the computer hardware processor is configured to execute additional computer-executable instructions to at least:
  apply a shared secret key in an encryption algorithm.

* * * * *